United States Patent
Yu et al.

(10) Patent No.: US 12,022,428 B2
(45) Date of Patent: Jun. 25, 2024

(54) REMOTE USER EQUIPMENT DIRECT TO INDIRECT PATH SWITCHING IN SIDELINK RELAY

(71) Applicant: Nokia Technologies Oy, Espoo (FI)

(72) Inventors: Ling Yu, Kauniainen (FI); György Tamás Wolfner, Budapest (HU); Vinh Van Phan, Oulu (FI); Berthold Panzner, Holzkirchen (DE); Jakob Lindbjerg Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 348 days.

(21) Appl. No.: 17/573,860

(22) Filed: Jan. 12, 2022

(65) Prior Publication Data

US 2023/0224853 A1    Jul. 13, 2023

(51) Int. Cl.
| | |
|---|---|
| *H04W 68/00* | (2009.01) |
| *H04W 8/00* | (2009.01) |
| *H04W 24/08* | (2009.01) |
| *H04W 74/0833* | (2024.01) |
| *H04W 92/18* | (2009.01) |

(52) U.S. Cl.
CPC ......... *H04W 68/005* (2013.01); *H04W 8/005* (2013.01); *H04W 24/08* (2013.01); *H04W 74/0833* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2012/0220214 A1* | 8/2012 | Du | H04B 7/15542 455/515 |
| 2015/0126206 A1* | 5/2015 | Krishnamurthy | H04W 56/001 455/452.1 |

(Continued)

FOREIGN PATENT DOCUMENTS

WO    2021/175162 A1    9/2021

OTHER PUBLICATIONS

International Search Report and Written Opinion received for corresponding Patent Cooperation Treaty Application No. PCT/EP2023/050366, dated Apr. 12, 2023, 17 pages.

(Continued)

*Primary Examiner* — Andre Tacdiran
(74) *Attorney, Agent, or Firm* — Harrington & Smith

(57) ABSTRACT

Systems, methods, apparatuses, and computer program products for remote user equipment direct to indirect path switching in sidelink relay are provided. For example, a method can include receiving, at a user equipment from a network element, a system information block message having an information element to configure monitoring of paging messages at a common paging occasion, which can be configured for user equipment that are in idle or inactive state and that are configured to act as a user-equipment-to-network relay user equipment. The method may also include monitoring a page at the common paging occasion based on the information element. The method may further include sending a random access preamble dedicated to the user equipment in response to the page. The method may additionally include performing a state transition to connected mode only after a response to the random access preamble is received.

13 Claims, 7 Drawing Sheets

(56) References Cited

U.S. PATENT DOCUMENTS

| | | | |
|---|---|---|---|
| 2017/0006659 A1* | 1/2017 | Jha | H04W 72/30 |
| 2018/0199344 A1* | 7/2018 | Liao | H04W 48/10 |
| 2023/0014030 A1 | 1/2023 | Li et al. | |
| 2023/0269702 A1* | 8/2023 | Zhang | H04W 60/005 |
| | | | 455/558 |
| 2024/0064700 A1* | 2/2024 | Zhang | H04W 52/0216 |

OTHER PUBLICATIONS

"Discussion on path switch for L2 UE to NW Relay", 3GPP TSG-RAN WG2 Meeting #113bis-e, R2-2104132, Agenda: 8.7.2.1, Huawei, Apr. 12-20, 2021, 8 pages.

"Introduction of Rel-17 Sidelink Relay", 3GPP TSG-RAN WG2 Meeting #116bis Electronic, R2-2200789, MediaTek Inc, Jan. 17-25, 2022, 37 pages.

"Discussion on supported relay UE RRC states in direct to indirect path switch", 3GPP TSG-RAN WG2 Meeting #116 Electronic, R2-2110371, Agenda: 8.7.2.2, Nokia, Nov. 1-12, 2021, 2 pages.

"Support of relay UE in RRC_Idle/Inactive state during direct to indirect path switching", 3GPP TSG-RAN WG2 Meeting #117 Electronic, R2-2203272, Agenda: 8.7.2.1, Nokia, Feb. 21-Mar. 3, 2022, 2 pages.

"Revised SID: Study on NR sidelink relay", 3GPP TSG RAN Meeting #89e, RP-201474, Agenda: 9.7.8, OPPO, Sep. 14-18, 2020, pp. 1-5.

"Revised SID: Study on System enhancement for Proximity based Services in 5GS", 3GPP TSG SA Meeting #84, SP-190443, Agenda: 6.4, SA WG2, Jun. 5-7, 2019, 4 pages.

"3rd Generation Partnership Project; Technical Specification Group Services and System Aspects; Study on system enhancement for Proximity based Services (ProSe) in the 5G System (5GS) (Release 17)", 3GPP TR 23.752, V17.0.0, Mar. 2021, pp. 1-183.

"3rd Generation Partnership Project; Technical Specification Group Radio Access Network; Study on NR sidelink relay; (Release 17)", 3GPP TR 38.836, V17.0.0, Mar. 2021, pp. 1-26.

"New WID on NR Sidelink Relay", 3GPP TSG RAN Meeting #91e, RP-210904, Agenda: 9.1.2, Ericsson, Mar. 16-26, 2021, 5 pages.

"Report of [AT114-e][605][Relay] Summary on AI 8.7.4.2 on L2 relay service continuity", 3GPP TSG-RAN WG2 Meeting #114-e, R2-2106578, Agenda: 8.7.4.2, Samsung, May 19-27, 2021, 61 pages.

"Discussion on service continuity in NR sidelink relay", 3GPP TSG-RAN WG2 #114-e, R2-2104894, Agenda: 8.7.4.2, OPPO, May 19-27, 2021, pp. 1-4.

"Discussion on service continuity and adaptation layer for L2 UE to NW Relay", 3GPP TSG-RAN WG2 #114-e, R2-2105741, Agenda: 8.7.4.2, Huawei, May 19-27, 2021, pp. 1-11.

"3rd Generation Partnership Project; Technical Specification Group Radio Access Network; NR; User Equipment (UE) procedures in Idle mode and RRC Inactive state (Release 16)", 3GPP TS 38.304, V16.6.0, Sep. 2021, pp. 1-39.

"3rd Generation Partnership Project; Technical Specification Group Radio Access Network; NR; Physical layer procedures for control (Release 16)", 3GPP TS 38.213, V16.7.0, Sep. 2021, pp. 1-188.

"3rd Generation Partnership Project; Technical Specification Group Services and System Aspects; Proximity based Services (ProSe) in the 5G System (5GS) (Release 17)", 3GPP TS 23.304, V17.0.0, Sep. 2021, pp. 1-99.

"3rd Generation Partnership Project; Technical Specification Group Radio Access Network; NR; Medium Access Control (MAC) protocol specification (Release 16)", 3GPP TS 38.321, V16.6.0, Sep. 2021, pp. 1-158.

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

"3rd Generation Partnership Project; Technical Specification Group Radio Access Network; NR; Multiplexing and channel coding (Release 16)", 3GPP TS 38.212, V16.7.0, Sep. 2021, pp. 1-153.

* cited by examiner

```
common-PO-config ::=   SEQUENCE {
   PagingCycle            ENUMERATED {n4, n8, n16, n32, n64, n128, n256}
            firstPagingFrameSFN     INTEGER {0 .. 255}
            NoofPOPerPF    INTEGER {1,2,4}
            FirstPOOffset    INTEGER {0 .. 9}
}
```

FIG. 3A

```
CommonPagingUE ID        BIT STRING (SIZE(40))
```

FIG. 3B

```
PCCH-Config ::=                SEQUENCE {
    defaultPagingCycle                    PagingCycle,
    nAndPagingFrameOffset                 CHOICE {
        oneT                                  NULL,
        halfT                                 INTEGER (0..1),
        quarterT                              INTEGER (0..3),
        oneEighthT                            INTEGER (0..7),
        oneSixteenthT                         INTEGER (0..15)
    },
    ns                                    ENUMERATED {four, two, one},
    firstPDCCH-MonitoringOccasionOfPO     CHOICE {
        sCS15KHZoneT
SEQUENCE (SIZE (1..maxPO-perPF)) OF INTEGER (0..139),
        sCS30KHZoneT-SCS15KHZhalfT
SEQUENCE (SIZE (1..maxPO-perPF)) OF INTEGER (0..279),
        sCS60KHZoneT-SCS30KHZhalfT-SCS15KHZquarterT
SEQUENCE (SIZE (1..maxPO-perPF)) OF INTEGER (0..559),
        sCS120KHZoneT-SCS60KHZhalfT-SCS30KHZquarterT-SCS15KHZoneEighthT
SEQUENCE (SIZE (1..maxPO-perPF)) OF INTEGER (0..1119),
        sCS120KHZhalfT-SCS60KHZquarterT-SCS30KHZoneEighthT-SCS15KHZoneSixteenthT
SEQUENCE (SIZE (1..maxPO-perPF)) OF INTEGER (0..2239),
        sCS120KHZquarterT-SCS60KHZoneEighthT-SCS30KHZoneSixteenthT
SEQUENCE (SIZE (1..maxPO-perPF)) OF INTEGER (0..4479),
        sCS120KHZoneEighthT-SCS60KHZoneSixteenthT
SEQUENCE (SIZE (1..maxPO-perPF)) OF INTEGER (0..8959),
        sCS120KHZoneSixteenthT
SEQUENCE (SIZE (1..maxPO-perPF)) OF INTEGER (0..17919)
    }    OPTIONAL,         -- Need R
    ...,
    [[
    nrofPDCCH-MonitoringOccasionPerSSB-InPO-r16
INTEGER (2..4)          OPTIONAL  -- Cond SharedSpectrum2
    ]]
}
```

FIG. 3C

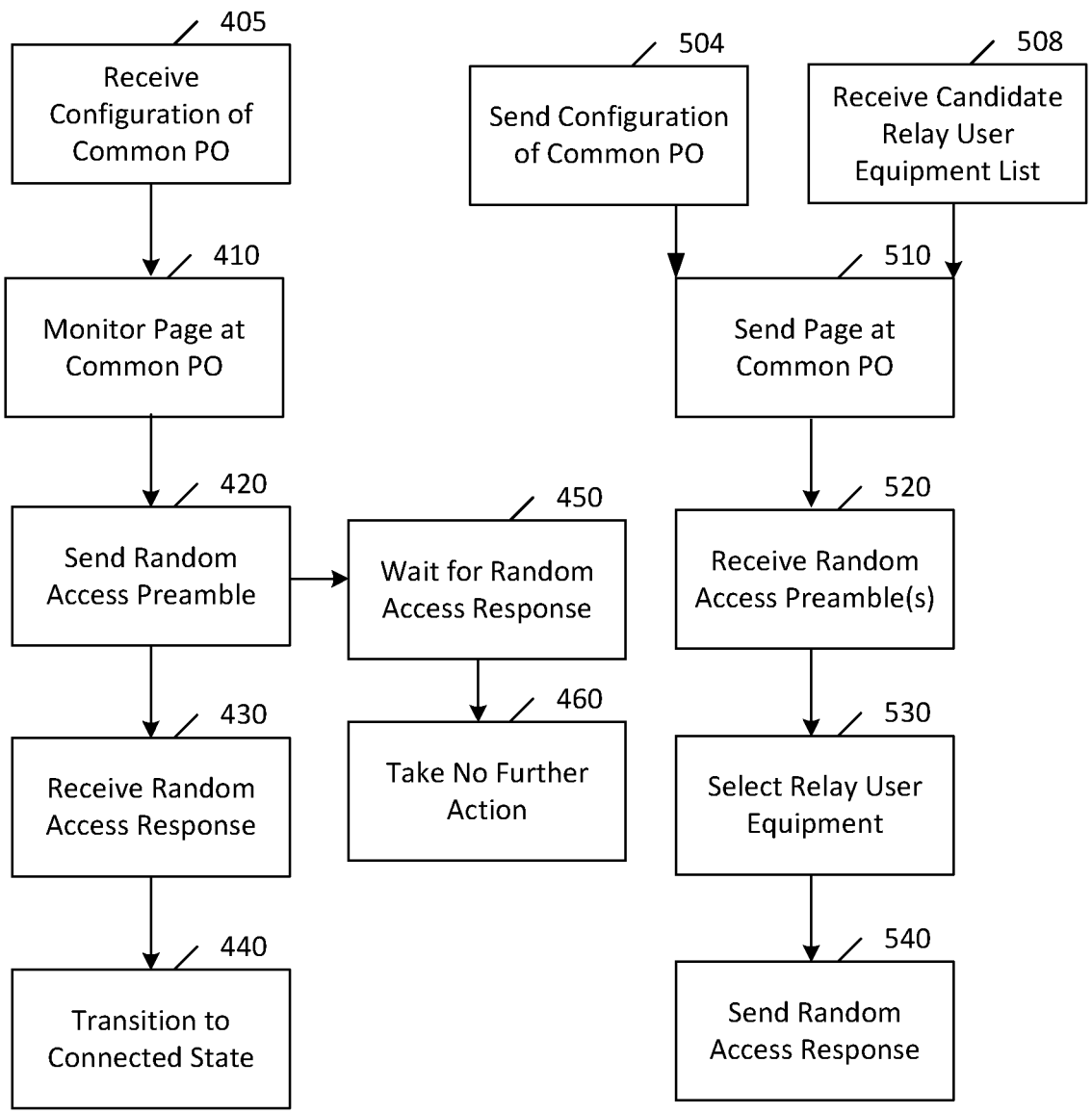

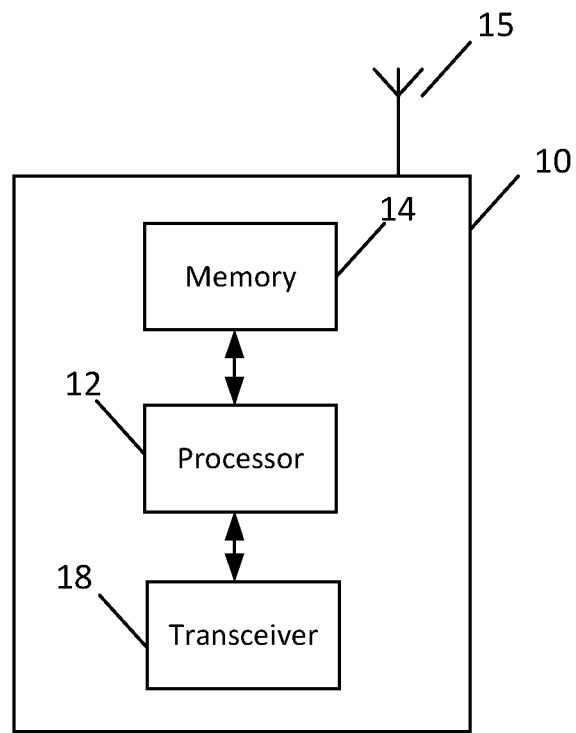
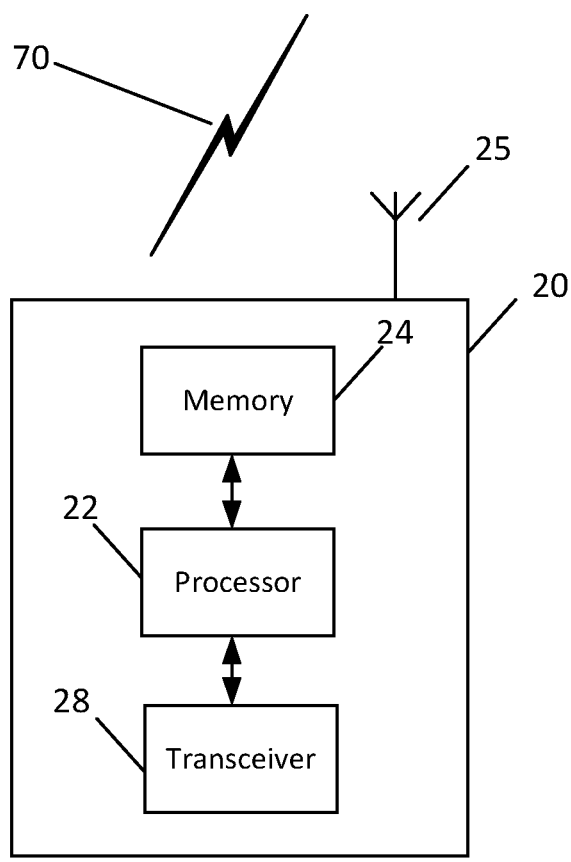
FIG. 6

REMOTE USER EQUIPMENT DIRECT TO INDIRECT PATH SWITCHING IN SIDELINK RELAY

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing remote user equipment direct to indirect path switching in sidelink relay.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IOT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform receiving, from a network element, a system information block message having an information element to configure monitoring of paging messages at a common paging occasion. The common paging occasion can be configured for user equipment that are in idle state or inactive state with respect to the network element and that are configured to act as a user-equipment-to-network relay user equipment. The at least one memory and computer program code can also be configured, with the at least one processor, to cause the apparatus at least to perform monitoring a page at the common paging occasion based on the information element. The at least one memory and computer program code can further be configured, with the at least one processor, to cause the apparatus at least to perform sending a random access preamble dedicated to the apparatus in response to the page. The at least one memory and computer program code can additionally be configured, with the at least one processor, to cause the apparatus at least to perform a state transition to connected mode only after a response to the random access preamble is received.

An embodiment may be directed to an apparatus. The apparatus can include at least one processor and at least one memory comprising computer program code. The at least one memory and computer program code can be configured, with the at least one processor, to cause the apparatus at least to perform broadcasting a configuration of a common paging occasion. The common paging occasion can be configured for user equipment that are in idle state or inactive state with respect to a network element and that are configured to act as a user-equipment-to-network relay user equipment. The at least one memory and computer program code can also be configured, with the at least one processor, to cause the apparatus at least to perform receiving a candidate relay user equipment list from a remote user equipment in a request for a path switch. The list can identify a plurality of relay user equipment. The at least one memory and computer program code can further be configured, with the at least one processor, to cause the apparatus at least to perform determining that at least one of the plurality of relay user equipment is in idle state or inactive state. The at least one memory and computer program code can additionally be configured, with the at least one processor, to cause the apparatus at least to perform sending a page to the at least one of the plurality of relay user equipment at the common paging occasion to check a link quality of the at least one of the plurality of relay user equipment. The at least one memory and computer program code can also be configured, with the at least one processor, to cause the apparatus at least to perform receiving one or more random access preambles dedicated to a corresponding one or more of the plurality of relay user equipment. The at least one memory and computer program code can also be configured, with the at least one processor, to cause the apparatus at least to perform selecting a single relay user equipment from the candidate relay user equipment list based on the link quality determined upon the received one or more random access preambles. The at least one memory and computer program code can further be configured, with the at least one processor, to cause the apparatus at least to perform sending a response to a corresponding random access preamble associated with the selected single relay user equipment, wherein the response indicates that the selected single relay user equipment has been selected to relay for the remote user equipment.

An embodiment may be directed to a method. The method may include receiving, at a user equipment from a network element, a system information block message having an information element to configure monitoring of paging messages at a common paging occasion. The common paging occasion can be configured for user equipment that are in idle state or inactive state with respect to the network element and that are configured to act as a user-equipment-to-network relay user equipment. The method may also include monitoring a page at the common paging occasion based on the information element. The method may further include sending a random access preamble dedicated to the user equipment in response to the page. The method may additionally include performing a state transition to connected mode only after a response to the random access preamble is received.

An embodiment may be directed to a method. The method may include broadcasting, by a network element, a configuration of a common paging occasion. The common paging occasion can be configured for user equipment that are in idle state or inactive state with respect to the network element and that are configured to act as a user-equipment-to-network relay user equipment. The method may also include receiving a candidate relay user equipment list from a remote user equipment in a request for a path switch. The list can identify a plurality of relay user equipment. The method may further include determining that at least one of the plurality of relay user equipment is in idle state or inactive state. The method may additionally include sending a page to the at least one of the plurality of relay user equipment at the common paging occasion to check a link quality of the at least one of the plurality of relay user equipment. The method may also include receiving one or more random access preambles dedicated to a corresponding one or more of the plurality of relay user equipment. The method may further include selecting a single relay user equipment from the candidate relay user equipment list based on the link quality determined upon the received one or more random access preambles. The method may additionally include sending a response to a corresponding random access preamble associated with the selected single relay user equipment, wherein the response indicates that the selected single relay user equipment has been selected to relay for the remote user equipment.

An embodiment may be directed to an apparatus. The apparatus may include means for receiving, at a user equipment from a network element, a system information block message having an information element to configure monitoring of paging messages at a common paging occasion. The common paging occasion can be configured for user equipment that are in idle state or inactive state with respect to the network element and that are configured to act as a user-equipment-to-network relay user equipment. The apparatus may also include means for monitoring a page at the common paging occasion based on the information element. The apparatus may further include means for sending a random access preamble dedicated to the user equipment in response to the page. The method may additionally include means for performing a state transition to connected mode only after a response to the random access preamble is received.

An embodiment may be directed to an apparatus. The apparatus may include means for broadcasting, by a network element, a configuration of a common paging occasion. The common paging occasion can be configured for user equipment that are in idle state or inactive state with respect to the network element and that are configured to act as a user-equipment-to-network relay user equipment. The apparatus may also include means for receiving a candidate relay user equipment list from a remote user equipment in a request for a path switch. The list can identify a plurality of relay user equipment. The apparatus may further include means for determining that at least one of the plurality of relay user equipment is in idle state or inactive state. The apparatus may additionally include means for sending a page to the at least one of the plurality of relay user equipment at the common paging occasion to check a link quality of the at least one of the plurality of relay user equipment. The apparatus may also include means for receiving one or more random access preambles dedicated to a corresponding one or more of the plurality of relay user equipment. The apparatus may further include means for selecting a single relay user equipment from the candidate relay user equipment list based on the link quality determined upon the received one or more random access preambles. The apparatus may additionally include means for sending a response to a corresponding random access preamble associated with the selected single relay user equipment, wherein the response indicates that the selected single relay user equipment has been selected to relay for the remote user equipment.

BRIEF DESCRIPTION OF THE DRAWINGS

For proper understanding of example embodiments, reference should be made to the accompanying drawings, wherein:

FIG. 3A illustrates an example of a common paging occasion related configuration, according to certain embodiments;

FIG. 3B illustrates another example of a common paging occasion related configuration, according to certain embodiments;

FIG. 3C illustrates an ordinary paging configuration;

FIG. 4 illustrates an example flow diagram of a method, according to an embodiment;

FIG. 5 illustrates an example flow diagram of a method, according to an embodiment; and FIG. 6 illustrates an example block diagram of a system, according to an embodiment.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing remote user equipment direct to indirect path switching in sidelink relay, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to methods, devices, and systems to facilitate beam refinement procedures. Certain embodiments may be applicable to fifth generation (5G) new radio (NR).

Certain embodiments may support new radio (NR) sidelink (SL) based user equipment (UE) to network (U2N) in the third generation partnership project (3GPP) release 17 (Rel. 17) and beyond. Certain embodiments may relate more specifically to mechanisms for service continuity for layer two (L2) relaying.

Figure 1A:
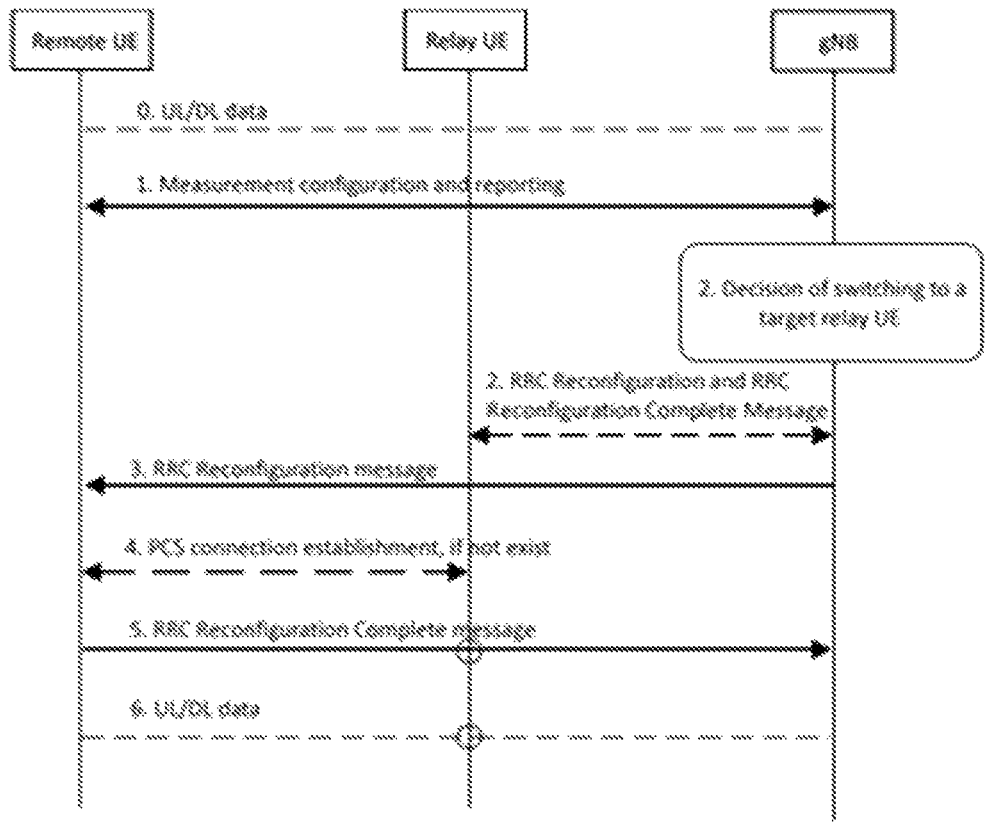
FIG. 1A illustrates a baseline procedure for remote user equipment switching to indirect relay user equipment.

FIG. 1A illustrates a baseline procedure for remote user equipment switching to indirect relay user equipment. As shown in FIG. 1A, at 0 there can be UL/DL data between a remote UE and a next generation Node B (gNB) directly. At 1, there can be measurement configuration and reporting.

Subsequently, at 2, the gNB can perform radio resource control (RRC) reconfiguration with a relay UE after the gNB determines to switch the remote UE to the target relay UE, and receive an RRC reconfiguration complete message from the relay UE.

Then, at 3, the gNB can send an RRC reconfiguration message to the remote UE to configure the remote UE to switch to indirect path via the selected target relay UE. If a PC5 connection does not already exist between the remote UE and the relay UE, at 4 PC5 connection establishment can be performed.

At 5, an RRC reconfiguration complete message can be provided to the gNB from the remote UE via the relay UE. Then, at 6, UL/DL data can be communicated between the remote UE and the gNB via the relay UE.

In this way, the remote UE can switch from a direct path to the gNB to an indirect path to the gNB via the relay UE.

The UE may use Discontinuous Reception (DRX) in RRC idle state (RRC_IDLE) and RRC inactive state (RRC_INACTIVE) in order to reduce power consumption. The UE can monitor one paging occasion (PO) per DRX cycle. A PO can be a set of physical downlink control channel (PDCCH) monitoring occasions and can include multiple time slots, such as a subframe or orthogonal frequency division multiplexing (OFDM) symbol, where paging downlink control information (DCI) can be sent. One Paging Frame (PF) can be one radio frame and may contain one or multiple PO(s) or a starting point of a PO.

The PF and PO for paging can be determined by the following formulas. The system frame number (SFN) for the PF can be determined by (SFN+PF_offset) mod T=(T div N)*(UE_ID mod N). Index (i_s), indicating the index of the PO, can be determined by i_s=floor (UE_ID/N) mod Ns.

The following parameters can be used for the calculation of PF and i_s. T can be the DRX cycle of the UE. T can be determined by the shortest of the UE specific DRX value(s), if configured by RRC and/or upper layers, and a default DRX value broadcast in system information. In RRC_IDLE state, if UE specific DRX is not configured by upper layers, the default value can be applied. N can be the number of total paging frames in T. Ns can be the number of paging occasions for a PF. PF_offset can be the offset used for PF determination. UE_ID can be the 5G-S-TMSI mod 1024. Thus, PF and PO for ordinary paging can be UE specific depending on each UE's own UE_ID.

UE-to-NW relay discovery can be used by the remote UE to discover candidate relay UEs and to report the discovered candidate relay UEs to the gNB, for example as part of procedure 1 of FIG. 1A.

Two models, labelled model A and model B for convenience, can be used by a remote UE to discover the relay UEs.

Figure 1B:
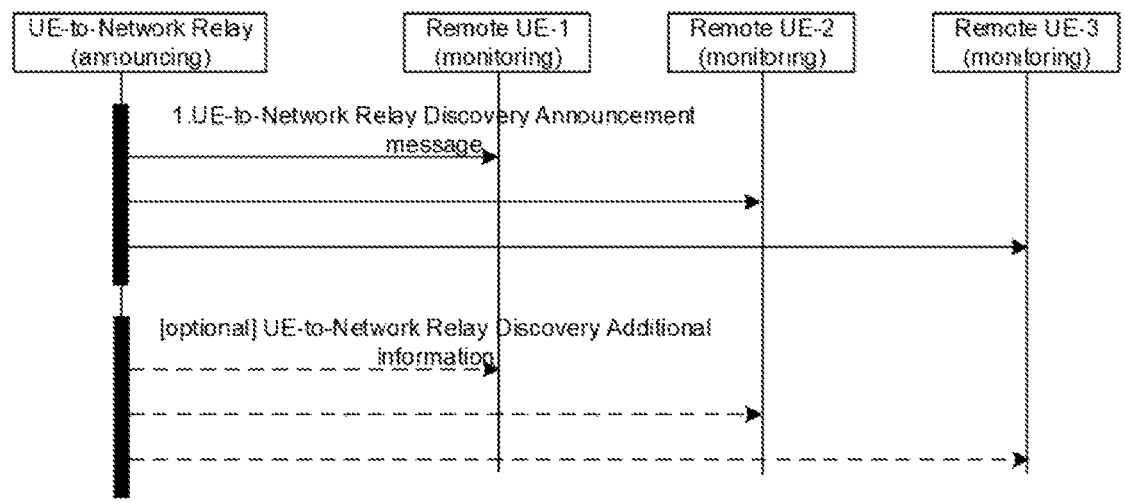
FIG. 1B illustrates a first model of discovery of relay user equipment candidates.

FIG. 1B illustrates a first model of discovery of relay user equipment candidates. The model of discovery shown in FIG. 1B can be referred to as model A, as mentioned above. Model A can use a single discovery protocol message 1, which can be referred to as an announcement. This can be a message transmitted from a relay UE, which can then be received by remote UEs, illustrated as remote UE-1, remote UE-2, and remote UE-3. As shown in FIG. 1B, in addition to the single announcement, there can be an optional UE-to-Network relay discovery additional information message.

Figure 1C:
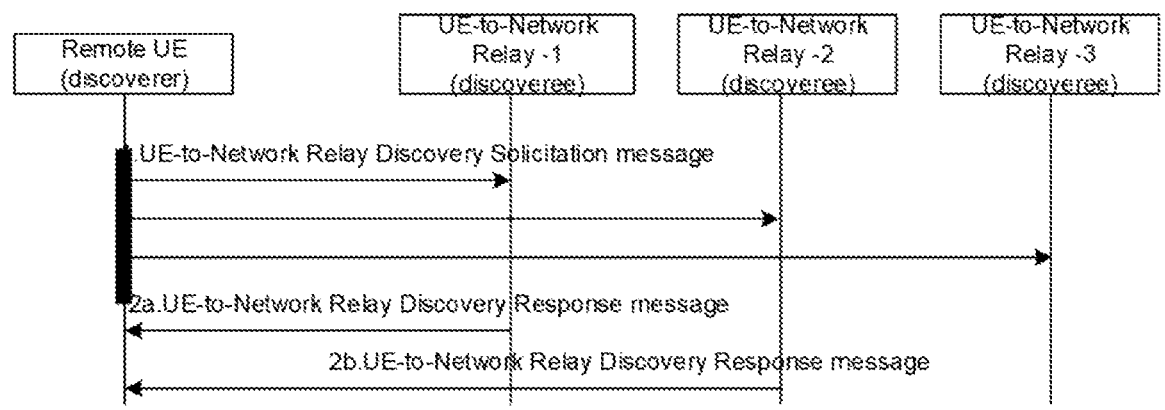
FIG. 1C illustrates a second model of discovery of relay user equipment candidates.

FIG. 1C illustrates a second model of discovery of relay user equipment candidates. The model of discovery shown in FIG. 1C can be referred to as model B, as mentioned above. Model B can rely on two discovery protocol messages, namely a solicitation message at 1, from the remote UE to all discoverable relay UEs, in this case UE-to-Network Relay-1, UE-to-Network Relay-2, and UE-to-Network Relay-3. Followed by response messages from the relay UEs that respond, in this case message 2a from UE-to-Network Relay-1 and message 2b from UE-to-Network Relay-2.

According to the baseline procedure for remote UE path switching from direct to indirect path via relay UE, remote UE reports the discovered candidate relay UEs in the measurement report. Then, the gNB can select the target relay UE and can make the decision of switching to the target relay UE. The Cell ID and PLMN ID may be included in the relay discovery message, but other information such as RRC state indication may not be provided in the relay discovery message. The RRC state of the relay UE may be RRC connected state (RRC_Connected), RRC inactive state (RRC_Inactive), or RRC idle state (RRC_Idle).

Accordingly, in such approaches, the remote UE may be unable to differentiate the discovered relay UEs in different RRC states. The reported relay UE candidates from remote UE to gNB may include the relay UE candidates in all RRC states: not only in RRC_Connected but also in RRC_Idle or RRC_Inactive. The gNB may also lack UE context information on the relay UEs in RRC_Idle and for the relay UEs in RRC_Inactive, unless gNB is the anchor gNB of a relay UE in RRC_Inactive. So only PC5 link/SL condition that each relay UE has towards to remote UE can be used by gNB for relay UE selection when relay UEs are in RRC_Idle or RRC_Inactive state, which may not lead to optimal relay UE selection as Uu link condition is not taken into account. Therefore, certain embodiments provide a signaling efficient solution to solve the issue of lacking Uu link information of candidate relay UEs in RRC_Idle or RRC_Inactive states.

Certain embodiments provide common paging opportunities for relevant relay UEs and an associated reduced random access channel (RACH) procedure to allow a gNB to measure the Uu link quality of each candidate relay UEs in RRC_Idle/Inactive state for selection of the optimal or best target relay UE during remote UE path switching from direct to indirect path via sidelink (SL) relay UE.

A common paging occasion for Relay UEs not in connected state (for example, in RRC_Idle or RRC_Inactive) may allow the gNB to page all relay UEs in RRC_Idle/Inactive state using one paging message after receiving the relay candidate list from the remote UE's measurement reports.

The common paging occasion can commonly page relevant relay UEs in RRC_Idle/Inactive state to trigger the relay UEs initiating the reduced RACH procedure.

Thus, the gNB can measure the radio link condition over Uu interface for each paged relay UE to facilitate gNB's decision on target relay UE selection by taking into account both Uu and SL radio conditions, for example link quality. A common paging occasion may be useful instead of different paging occasions derived from each relay UE's own UE_ID. Common paging occasions can reduce delay of paging relay UEs for Uu link condition measurement and thus also reduce delay of relay UE selection. There may be no need to wait for paging the relay UE for Uu link condition measurement until the last paging occasion of all relevant relay UEs.

The relay UE ID that the remote UE reported in the remote UE's measurement report and a dedicated RACH preamble can be indicated in the paging message using the common paging occasion. The RACH preamble may allow the paged relay UE to perform a reduced RACH procedure described below using the dedicated RACH preamble.

Relay UEs in RRC_Idle/Inactive state, upon sending relay discovery message in model A or relay discovery response message in model B, can monitor the common paging occasion to determine whether there is special paging message targeted to the relay UE based on whether the relay UE's relay UE ID is included in the paging message receiving in the common paging occasion. Thus, the relay UE may monitor the common paging occasions in addition to its own paging occasion calculated from UE ID.

A reduced RACH procedure associated with the common paging occasion may allow the gNB to measure Uu link quality of paged relay UEs based on the RACH preamble transmission from relay UEs. The UE behavior for initiating the reduced RACH procedure, as well as UE behavior upon missing a RACH response, can be different from a normal RACH procedure. Thus, the RACH procedure section of the medium access control (MAC) specification 3GPP technical specification (TS) 38.321 may be changed or a different approach from that described in 3GPP TS 38.321 may be followed.

A relay UE, upon identifying the targeted paging message in the common paging occasion, can initiate a reduced RACH procedure by sending the dedicated RACH preamble using the transmission power that is configured by the gNB for the reduced RACH procedure. The reduced RACH procedure instead of normal RACH procedure can be triggered by receiving a targeted paging message at the common paging occasion.

The gNB can measure the Uu link quality from the RACH preamble transmission from the paged relay UEs in RRC_Idle/Inactive. The gNB can select the target relay UE by taking into account the Uu link quality measured by the gNB.

If the gNB selects one of the paged relay UE in RRC_Idle/Inactive state as the target relay UE, the gNB can send a RACH response to the selected target relay UE, which can trigger the target relay UE to establish/resume the target relay UE's RRC connection with gNB.

The other paged relay UEs can stop RACH procedure, rather than sending RACH preamble retransmissions with increased transmission power as in normal RACH procedures. This stopping can be the response to failing to receive the RACH response from the gNB after sending the RACH preamble.

Thus, in certain embodiments, a procedure for supporting direct to indirect path switching for a remote user equipment can include multiple aspects.

According to a first aspect, the procedure can include receiving, from a serving gNB, a configuration that includes designated paging occasions for monitoring for a page from the serving gNB for checking a link quality or other radio condition of the relay UE for a relay selection to be performed by the gNB.

According to a second aspect, the procedure can include monitoring for a page from the serving gNB on the designated paging occasions.

According to a third aspect, the procedure can include sending the RACH preamble dedicated to the relay UE, to the serving gNB upon receiving a page from the serving gNB on a designated paging occasion according to the received configuration.

According to a fourth aspect, the procedure can include, in case a response to the RACH preamble is received from the serving gNB, performing a state transition from either IDLE or INACTIVE state to CONNECTED state to the serving gNB.

According to a fifth aspect, the procedure can include, in case no response to the RACH preamble is received from the serving gNB, remaining in either IDLE or INACTIVE state without resending the RACH preamble.

Figure 2:
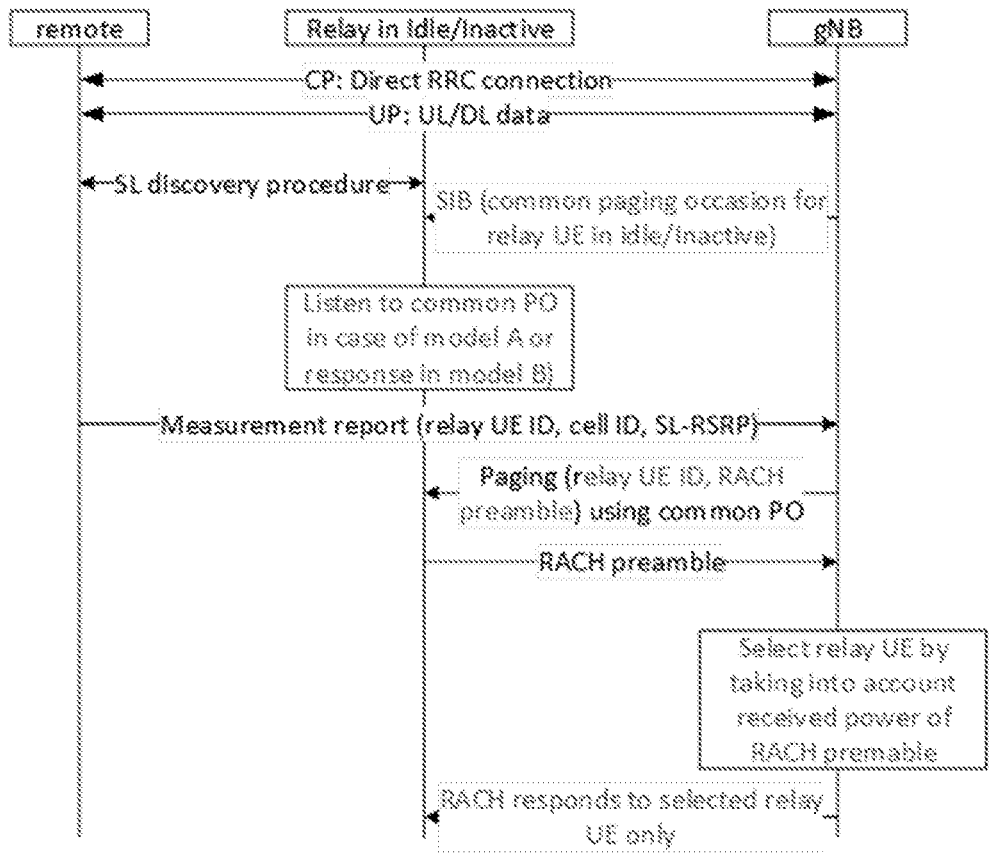
FIG. 2 illustrates a sequence diagram of signaling messages according to certain embodiments.

FIG. 2 illustrates a sequence diagram of signaling messages according to certain embodiments. FIG. 2 may be an example illustration of certain aspects of the procedure described above, as well as other aspects of the procedures. Thus, FIG. 2 should be understood as an example for the purpose of illustration, without limitation.

In FIG. 2, before the remote UE's path switching from direct path to indirect path, the remote UE can have direct connection with gNB for control plane (CP) and user plane (UP) data transmission. After a SL discovery procedure (see, for example, 3GPP TS 23.304 for examples of discovery procedures), the gNB can send an SIB to the relay UEs in idle or inactive states indicating a common paging occasion. The sequence of SL discovery and gNB sending SIB for common paging occasion configuration can be independent of one another. Thus, the gNB sending the SIB to the relay UEs does not need to have any particular timing order with respect to the SL discovery procedure. The features of FIG. 2, therefore, should be understood to be a non-limiting example. In certain embodiments, the common paging occasion can be configured by the gNB via broadcast system information in one of the SIBs. For example, the common paging occasion can be indicated in system information block (SIB) for RRC_Idle/Inactive UE or in the SIB for SL or SL relay related configuration.

The relays in idle/inactive states can listen to the common PO. The configuration of the common paging occasion in SIB may include the explicit common PO related information elements (IEs) such as paging frame in term of System Frame Number (SFN), the number of paging occasions in each paging frame and start point of first common paging occasion in term of subframe or slot. Alternatively, the configuration of the common paging occasion in SIB may include a common paging UE_ID to configure the relay UEs to derive the common paging occasion related information (e.g. paging frame of common paging occasion, start point of first common paging occasion) in a similar way as other paging occasion derivation, as explained above. The difference between the common paging occasion and the normal paging occasion is that the common paging occasion can be common for all relay UEs in RRC_Idle/Inactive state and the relay UE does not need to use the relay UE's own UE ID to derive the common paging occasion. This approach may be particularly beneficial for occasions where it is desired to obscure the list provided by the remote UE, where it is desired to page all relay UEs to address multiple remote UE requests, or the like.

FIG. 3A illustrates an example of a common paging occasion related configuration, according to certain embodiments. This common paging occasion related configuration may be provided in SIB. In this example, the paging cycle, first paging frame SFN, number of paging occasions per PF (NoofPOPerPF) and first paging occasions offset can be indicated.

FIG. 3B illustrates another example of a common paging occasion related configuration, according to certain embodiments. In this example, a common paging user equipment identifier (CommonPagingUE_ID) can be indicated.

FIG. 3C illustrates an ordinary paging configuration. The configured common paging UE ID can be used together with the ordinary paging configuration to derive the common paging occasion using the formulas mentioned above.

Because the relay UE does not know when the remote UE reports the relay UE as a candidate relay UE to the gNB, as shown in FIG. 2 the relay UE in RRC_Idle/Inactive state may need to monitor the common paging occasion if the relay UE is ready for acting as relay UE and transmits the relay discovery message in model A or the relay UE receives the relay discovery solicitation message and sends the relay discovery response message to the remote UE.

When remote UE identifies the need of path switching from direct to indirect path, the remote UE can discover the candidate relay UEs using either model A or model B discovery procedure (or any other desired procedure) and can report the discovered candidate relay UEs to the gNB in the measurement report. The relay UE ID, the cell ID of cell that the relay UE is connected to or camp in, SL-RSRP are included for each candidate relay UE in the measurement report message. Optionally, the UE may merely indicate information about the UE itself, which the gNB could treat as a request to identify a suitable relay UE for the remote UE, e.g. based on pre-configured association between relay UE and remote UE. Thus, a request may be implicit or inferred by the gNB, rather than being an explicit request.

When the gNB receives the measurement report from remote UE, which includes the discovered candidate relay UE list (or another indication from the UE), the gNB may identify that there are candidate relay UEs camping in the gNB's cell. The gNB may not have the relay UE's context (for example, the relay UE may be in RRC_Idle state) or only RRC_Inactive UE context may be available. The gNB may then decide to page the candidate relay UEs in RRC_Idle/Inactive using the common paging occasion or the ordinary paging occasion of the candidate relay UE. It may not be necessary to page all the candidate relay UEs in RRC_Idle/Inactive state. The selection of the candidate relay UEs to be paged may depend on the number of relay UEs in RRC_Connected and RRC_Idle/Inactive state respectively and/or the SL-RSRP that remote UE reported for each relay UE. For instance, a limited number, N, of the candidate relay UEs in RRC_Idle/Inactive state with highest SL-RSRP may be paged by gNB in certain embodiments. As another option, any time the list contains more than N specific relay UE IDs, the gNB may page all relay UEs without specifically identifying the relay UEs.

In certain embodiments, gNB may use the relay UE's ordinary paging occasion to page the UE for the reduced RACH procedure if the ordinary paging occasion of the relay UE happens earlier than the next common paging occasion. As the special paging message triggers the reduced RACH procedure instead of the normal RACH procedure, if the special paging message is transmitted using the ordinary paging occasion, a new indication bit may be included in the paging message that had been specified in 3GPP TS 38.331. The new indication bit may allow the relay UE know that the reduced RACH procedure should be triggered instead of a normal RACH procedure.

The paging message for relay UE in RRC_Idle/Inactive state, regardless whether the common paging occasion or ordinary paging occasion is used, can include the relay UE's ID and the dedicated RACH preamble for the paged relay UE to perform the reduced RACH procedure. Including more information such as dedicated RACH preamble in the paging message should not bring any issue. Unlike ordinary CN or RAN initiated paging message that is transmitted in multiple cells of the whole tracking area or RNA area, the paging message using common paging occasion may be transmitted in only one serving cell instead of multiple cells, which may make the size of the paging message less significant from a resource efficiency point of view. The pair of relay UE's ID and dedicated RACH preamble for each paged relay UE in the paging message may allow the relay UE to identify the targeted paging message based on relay UE's ID, so that the reduced RACH procedure is triggered by sending the dedicated RACH preamble. Thus the gNB can identify the relay UE upon receiving/detecting the dedicated RACH preamble by mapping back from the dedicated RACH preamble to relay UE's ID. The gNB can also measure the Uu radio link condition of the relay UE by measuring the received power or quality of each dedicated RACH preamble.

To prevent unnecessary reception of any relay UE in the common paging occasion, the remote UE may indicate that the relay discovery model B is used in the measurement report along with the candidate relay UE list. For example, when remote UE used model B for relay discovery while a given relay UE operates in model A, the relay UE may not need to receive the paging message if the model A relay UE did not respond to the remote UE's solicitation message.

When the gNB pages the relay UEs as illustrated in FIG. 2, in the paging using the common paging occasion, the gNB can send downlink control information (DCI) in PDCCH to indicate the scheduled DL resources for transmitting the paging message over PDSCH. In certain embodiments, a new indication bit of model B discovery can be included in DCI corresponding to the paging message to disable the relay UEs operating in model A discovery to receive the paging message transmitted in the common paging occasion. In another embodiment, the DCI may include the remote UE ID (full remote UE ID or part of remote UE ID, such as a few least/most significant bits of the remote UE ID). The inclusion of such information may disable the reception of the paging message by the relay UEs either operating in model A or operating in model B but didn't send relay discovery response message to the remote UE identified by the indicated remote UE ID in the DCI. In either embodiment, a new information element in DCI for scheduling the paging message transmission can be included.

The relay UE in RRC_Idle/Inactive state, upon detecting the page message targeted to itself, may determine whether to perform the reduced RACH procedure or not. For instance, the relay UE may be configured a DL-RSRP threshold to determine whether the relay UE responds with reduced RACH procedure after the relay UE receives the paging for the relay UE while in RRC_Idle/Inactive state. Thus, the relay UE with, for example low DL-RSRP, may not respond to the paging message. In this case, the gNB may not select the relay UE as the target relay UE.

If the relay UE determines to respond to the paging message with reduced RACH procedure, the relay UE can transmit the dedicated RACH preamble indicated in the paging message. The normal RACH preamble transmission opportunity may be used. As one embodiment, the reduced RACH preamble transmission opportunity may be associated with the common paging occasion and specific only to the reduced RACH procedure. The association can be either hard-coded in an agreed specification or can be configured using an SIB message, as discussed above. Thus, the information element in the SIB message can be configured to include a configuration of a random access channel preamble transmission opportunity associated with the common paging occasion. Alternatively, a random access channel preamble transmission opportunity associated with the common paging occasion can have a predetermined time interval toward the common paging occasion. This predetermined time interval can be a time interval agreed in a specification and configured to the UE by, for example, the manufacturer or the like. In this case, all the RACH preambles can be available to be allocated to the relay UEs as the dedicated RACH preamble. The transmission power of RACH preamble can also be configured by the gNB common to all relay UEs so that each relay UE can use the same transmission power to send the RACH preamble. In this case, the gNB may more easily compare Uu link quality of the relay UEs to one another based on received power of RACH preamble.

When gNB receives the RACH preambles transmitted from paged relay UEs, the gNB can measure the received power of each RACH preamble as their Uu link quality indicator. Together with SL-RSRP of each candidate relay UE and Uu link quality of each candidate relay UE in RRC_Connected state, the gNB can select the target relay UE by taking into account both SL and Uu link quality regardless whether the candidate relay UE is in RRC_Connected or RRC_Idle/Inactive state.

If the gNB selects the target relay UE that is in RRC_Idle/Inactive state, the gNB may send an RACH response message to the selected relay UE to trigger the relay UE establish/resume the relay UE's RRC connection. The gNB may not send an RACH response to any other paged relay UEs that sent the RACH preamble. Those relay UEs that do not receive an RACH response may simply stop the reduced RACH procedure and keep in RRC_Idle/Inactive state. For example, the relay UEs may not attempt power ramping or the like.

In certain embodiments, a group of RACH preambles reserved for the reduced RACH procedure may be configured to the relay UEs using SIB. Thus, the paging message transmitted using common paging occasion may not include the dedicated RACH preambles for each relay UE, the paged relay UE can select RACH preamble from the configured group of RACH preambles for the reduced RACH procedure. In this embodiment, gNB may select, for example, the relay UE from which the RACH preamble is received first among all the paged relay UEs and then may send the RACH response to the selected relay UE. This embodiment may not enable gNB to select the best relay UE in term of Uu link, but it may enable fast RRC connection establishment/resume of the selected relay UE in RRC_Idle/Inactive after reassuring the reachability of the selected relay UEs with the reduced RACH procedure. In another embodiment, the gNB may select the relay UE according to measured Uu link quality from received RACH preambles as described above. The gNB can identify the selected relay UE only after sending the RACH response to the selected relay UE and the selected relay UE establishes/resumes RRC connection to the gNB.

FIG. 4 illustrates an example flow diagram of a method for providing remote user equipment direct to indirect path switching in sidelink relay, according to certain embodiments.

The method can include, at 410, monitoring, by a relay user equipment, a page from a network element at a common paging occasion. The monitoring the page can be conditioned on the relay user equipment having sent a relay discovery message or a relay discovery response message. The monitoring can be further conditioned on a timer not having elapsed since the relay discovery response was sent or the relay discovery message was sent. The monitoring the page can be conditioned on a DCI in PDCCH including an indicator of a UE to which the relay UE sent a relay discovery response or an indicator of a relay discovery model that the relay UE uses. That is the monitoring page can be conditioned on the relay user equipment being configured to perform relay discovery according to a type of relay discovery indicated by the downlink control information. More particularly, the monitoring the page can be conditioned on a downlink control information in a physical downlink control channel that includes an indicator of a discovery model that the user equipment performs. For example, if a relay UE uses model B and the DCI includes model B indication, the relay UE can receive the paging message based on the received DCI. Otherwise, in such a case the relay UE that doesn't use model B discovery does not need to receive the paging message. Thus, the relay UE can monitor paging occasion for the DCI and decide whether to receive paging message based on indication in DCI.

The method can also include, at 420, sending a random access preamble dedicated to the relay user equipment in response to the page. For example, a RACH preamble may be sent, as described above.

The sending, at 420, can further be conditioned on a DL RSRP exceeding a predetermined threshold. The predetermined threshold can be selected such that the radio link is expected to be reliable when the DL RSRP exceeds the threshold and unreliable when the DL RSRP does not exceed the threshold.

The sending, at 420, can be performed according to a time slot, occasion, or time interval that is configured by the network element. The page can include an identifier of the apparatus and the random access preamble dedicated to the apparatus. The sending, at 420, can be performed conditioned on the identifier of the apparatus being present in the page.

The method can further include, at 405, receiving, from the network element, a configuration of the common paging occasion. The receiving can, for example, include receive, at a user equipment from a network element, a system information block message having an information element to configure monitoring of paging messages at a common paging occasion. The common paging occasion can be configured for user equipment that are in idle state or inactive state with respect to the network element and that are configured to act as a user-equipment-to-network relay user equipment. As mentioned above, as another alternative, the configuration of the common paging occasion can be included in a communication standard. The monitoring at 410 can be based on the information element, for example the monitoring can be based on the configuration provided in the information element.

The page can include an identifier of the relay user equipment. The sending at 420 can be performed conditioned on the identifier of the relay user equipment being present in the page. If the identifier is not present, the relay user equipment may simply await the next common paging occasion.

The method can further include, at 430, receiving a response to the random access preamble. For example, a serving network element, such as a gNB, can provide the response. The method can also include, at 440, transitioning from an idle state or an inactive state to a connected state conditioned on the receiving the response. The transitioning can include performing a state transition to connected mode only after a response to the random access preamble is received.

The method can further include, at 450, waiting for a response to the random access preamble. This waiting can also precede receiving a response at 430. On the other hand, in some cases no response may be provided. Accordingly, at 460, the relay user equipment can proceed by taking no further action regarding the random access preamble if the response is not received. For example, retransmissions of the preamble can be completely omitted.

The page can include a list of identifiers of relay user equipment including an identifier of the relay user equipment. As another option, the page could indicate that any relay user equipment should respond, without identifying a specific relay user equipment.

It is noted that FIG. 4 is provided as one example embodiment of a method or process. However, certain embodiments are not limited to this example, and further examples are possible as discussed elsewhere herein.

FIG. 5 illustrates an example flow diagram of a method for providing remote user equipment direct to indirect path switching in sidelink relay, according to certain embodiments. The method of FIG. 5 can be used alone or in combination with the method of FIG. 4.

The method can include, at 510, sending (for example, broadcasting), by a network element, a page to a plurality of relay user equipment at a common paging occasion. This may be the same page monitored at 410 in FIG. 4. The page can include an identifier of each of the plurality of relay user equipment.

As shown in FIG. 5, the method can also include, at 520, receiving one or more random access preambles dedicated to a corresponding one or more of the plurality of relay user equipment. In some cases, every relay equipment of the plurality of relay user equipment may respond, but other cases some subset of the plurality of relay user equipment may respond.

The method can also include, at 504, sending (for example, broadcasting) a configuration of the common paging occasion to each of the plurality of relay user equipment. This may be the same configuration received at 405 in FIG. 4.

As shown in FIG. 5, the method can also include at 530, selecting one relay user equipment from the plurality of relay user equipment based on the one or more random access preambles received. The selecting can be based on a respective measure of link quality from each respective random access preamble received by the network element. Various factors can be considered, with one of them being link quality, such as link quality of the Uu interface.

The method can further include, at 540, sending a response to the random access preamble to the selected one relay user equipment. This can be the same response received at 430 in FIG. 4. The response can indicate that the specific single relay user equipment has been selected to serve as the relay for the remote user equipment.

The selecting can depend on a number of relay UEs in connected state, idle state, and inactive state, respectively, or SL-RSRP that the remote user equipment reported for each relay user equipment, or both.

As shown in FIG. 5, the method can also include, at 508, receiving a candidate relay user equipment list from a remote user equipment. The list can be received in a request for path switch or a measurement report. The sending the page at 510 can include sending the page to each relay user equipment of the candidate relay user equipment list, and only those relay user equipment on the list. The method can also include determining which of the user equipment on the list are in idle state or inactive state. The page may be sent only to a subset of the relay user equipment on the list, limited to those that are in idle state or inactive state. The sending the page can be to check on a link quality or other radio condition of the relay user equipment to which the page is sent. The network element may make a determination or decision regarding whether to check the link quality or other radio condition.

It is noted that FIG. 5 is provided as one example embodiment of a method or process. However, certain embodiments are not limited to this example, and further examples are possible as discussed elsewhere herein.

FIG. 6 illustrates an example of a system that includes an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6.

As illustrated in the example of FIG. 6, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IOT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-5, or any other method described herein. In some embodiments, as discussed herein, apparatus 10 may be configured to perform a procedure relating to providing remote user equipment direct to indirect path switching in sidelink relay, for example.

FIG. 6 further illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IOT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IOT, Bluetooth, NFC, MulteFire, and/or any other radio access technologies. It should be noted that one of ordinary skill in the art would understand that apparatus 20 may include components or features not shown in FIG. 6.

As illustrated in the example of FIG. 6, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IOT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IOT device, or the like, for example. According to certain embodiments, apparatus 20 may be controlled by memory 24 and processor 22 to perform the functions associated with any of the embodiments described herein, such as one or more of the operations illustrated in, or described with respect to, FIGS.

1-5, or any other method described herein. For example, in an embodiment, apparatus 20 may be controlled to perform a process relating to providing remote user equipment direct to indirect path switching in sidelink relay, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may enable the gNB to select the target relay UE regardless of the relay UE's RRC state. It may be possible for the gNB to take into account both Uu and SL link quality for relay UE selection even for some of the candidate relay UEs in RRC_Idle/Inactive state without introducing too much signaling and processing overhead to trigger every candidate relay UEs transition to RRC_Connected state. Certain embodiments may also enable faster establishment of the relay connection when the relay UE is in RRC_Idle/Inactive state, as the gNB may trigger the RRC connection establishment for the selected relay UE before the PC5 connection establishment is started.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

According to certain embodiments, a method can include receiving, at a user equipment from a network element, a system information block message having an information element to configure monitoring of paging messages at a common paging occasion. The common paging occasion can be configured for user equipment that are in idle state or inactive state with respect to the network element and that are configured to act as a user-equipment-to-network relay user equipment. The method can also include monitoring a page at the common paging occasion based on the information element. The method can further include sending a random access preamble dedicated to the user equipment in response to the page. The method can additionally include performing a state transition to connected mode only after a response to the random access preamble is received.

In some embodiments, the monitoring the page can be conditioned on the user equipment having sent a relay discovery message or a relay discovery response message.

In some embodiments, the monitoring the page can be further conditioned on a timer not having elapsed since the relay discovery response was sent or the relay discovery message was sent.

In some embodiments, the monitoring the page can be conditioned on a downlink control information in a physical downlink control channel including an indicator of a discovery model that the user equipment performs.

In some embodiments, the monitoring the page can be conditioned on a downlink control information in a physical downlink control channel including an indicator of a user equipment to which the user equipment sent a relay discovery response.

In some embodiments, the sending the random access preamble can be conditioned on a downlink reference signal received power exceeding a predetermined threshold.

In some embodiments, the method can further include waiting for a response to the random access preamble and taking no further action regarding the random access preamble if the response is not received.

In some embodiments, the sending of the random access preamble can be performed according to a time slot, occasion, or time interval that is configured by the network element.

In some embodiments, the page can include an identifier of the user equipment and the random access preamble dedicated to the user equipment. The sending can be performed conditioned on the identifier of the user equipment being present in the page.

In some embodiments, the page can include a list of identifiers of relay user equipment including an identifier of the user equipment.

In some embodiments, the information element can be configured to include a configuration of a random access channel preamble transmission opportunity associated with the common paging occasion.

In some embodiments, a random access channel preamble transmission opportunity associated with the common paging occasion can have a predetermined time interval toward the common paging occasion.

According to certain embodiments, a method can include broadcasting, by a network element, a configuration of a common paging occasion, wherein the common paging occasion is configured for user equipment that are in idle state or inactive state with respect to the network element and that are configured to act as a user-equipment-to-network relay user equipment. The method can also include receiving a candidate relay user equipment list from a remote user equipment in a request for a path switch, wherein the list identifies a plurality of relay user equipment. The method can further include sending a page to at least one of the plurality of relay user equipment at the common paging occasion to check a link quality of the at least one of the plurality of relay user equipment. The method can additionally include receiving one or more random access preambles dedicated to a corresponding one or more of the plurality of relay user equipment. The method can also include selecting a single relay user equipment from the candidate relay user equipment list based on the link quality determined upon the received one or more random access preambles. The method can further include sending a response to a corresponding random access preamble associated with the selected single relay user equipment. The response can indicate that the selected single relay user equipment has been selected to relay for the remote user equipment.

In some embodiments, the method can further include determining that the at least one of the plurality of relay user equipment is in idle state or inactive state. The page can be sent to the at least one of the plurality of relay user equipment in accordance with the determination.

In some embodiments, the page can include an identifier of each of the plurality of relay user equipment.

In some embodiments, the page can further include a respective random access preamble dedicated to each corresponding relay user equipment of the plurality of relay user equipment.

In some embodiments, the selecting can further be based on a respective measure of link quality from each respective random access preamble received by the network element.

In some embodiments, the sending of the configuration can include indicating a time slot, occasion, or time interval for the common paging occasion.

In some embodiments, the selecting can depend on a number of relay user equipment in connected state, idle state, and inactive state, respectively, or sidelink reference signal received power that the remote user equipment reported for each relay user equipment, or a combination thereof.

In some embodiments, the information element can be configured to include a configuration of a random access channel preamble transmission opportunity associated with the common paging occasion.

In some embodiments, a random access channel preamble transmission opportunity associated with the common paging occasion can have a predetermined time interval toward the common paging occasion.

According to certain embodiments, an apparatus can include means for receiving, at a user equipment from a network element, a system information block message having an information element to configure monitoring of paging messages at a common paging occasion. The common paging occasion can be configured for user equipment that are in idle state or inactive state with respect to the network element and that are configured to act as a user-equipment-to-network relay user equipment. The apparatus can also include means for monitoring a page at the common paging occasion based on the information element. The apparatus can further include means for sending a random access preamble dedicated to the user equipment in response to the page. The apparatus can additionally include means for performing a state transition to connected mode only after a response to the random access preamble is received.

In some embodiments, the monitoring the page can be conditioned on the user equipment having sent a relay discovery message or a relay discovery response message.

In some embodiments, the monitoring the page can be further conditioned on a timer not having elapsed since the relay discovery response was sent or the relay discovery message was sent.

In some embodiments, the monitoring the page can be conditioned on a downlink control information in a physical downlink control channel including an indicator of a discovery model that the user equipment performs.

In some embodiments, the monitoring the page can be conditioned on a downlink control information in a physical downlink control channel including an indicator of a user equipment to which the user equipment sent a relay discovery response.

In some embodiments, the sending the random access preamble can be conditioned on a downlink reference signal received power exceeding a predetermined threshold.

In some embodiments, the apparatus can also include means for waiting for a response to the random access preamble and means for taking no further action regarding the random access preamble if the response is not received.

In some embodiments, the sending of the random access preamble can be performed according to a time slot, occasion, or time interval that is configured by the network element.

In some embodiments, the page can include an identifier of the user equipment and the random access preamble dedicated to the user equipment, and the sending can be performed conditioned on the identifier of the user equipment being present in the page.

In some embodiments, the page can include a list of identifiers of relay user equipment including an identifier of the user equipment.

In some embodiments, the information element can be configured to include a configuration of a random access channel preamble transmission opportunity associated with the common paging occasion.

In some embodiments, a random access channel preamble transmission opportunity associated with the common paging occasion can have a predetermined time interval toward the common paging occasion.

According to certain embodiments, an apparatus can include means for broadcasting, by a network element, a configuration of a common paging occasion. The common paging occasion can be configured for user equipment that are in idle state or inactive state with respect to the network element and that are configured to act as a user-equipment-to-network relay user equipment. The apparatus can also include means for receiving a candidate relay user equipment list from a remote user equipment in a request for a path switch. The list can identify a plurality of relay user equipment. The apparatus can further include means for sending a page to at least one of the plurality of relay user equipment at the common paging occasion to check a link quality of the at least one of the plurality of relay user equipment. The apparatus can additionally include means for receiving one or more random access preambles dedicated to a corresponding one or more of the plurality of relay user equipment. The apparatus can also include means for selecting a single relay user equipment from the candidate relay user equipment list based on the link quality determined upon the received one or more random access preambles. The apparatus can further include means for sending a response to a corresponding random access preamble associated with the selected single relay user equipment. The response can indicate that the selected single relay user equipment has been selected to relay for the remote user equipment.

In some embodiments, the apparatus can also include means for determining that the at least one of the plurality of relay user equipment is in idle state or inactive state. The page can be sent to the at least one of the plurality of relay user equipment in accordance with the determination.

In some embodiments, the page can include an identifier of each of the plurality of relay user equipment.

In some embodiments, the page can further include a respective random access preamble dedicated to each corresponding relay user equipment of the plurality of relay user equipment.

In some embodiments, the selecting can be further based on a respective measure of link quality from each respective random access preamble received by the apparatus.

In some embodiments, the sending of the configuration can include indicating a time slot, occasion, or time interval for the common paging occasion.

In some embodiments, the selecting can depend on a number of relay user equipment in connected state, idle state, and inactive state, respectively, or sidelink reference signal received power that the remote user equipment reported for each relay user equipment, or a combination thereof.

In some embodiments, the information element can be configured to include a configuration of a random access channel preamble transmission opportunity associated with the common paging occasion.

In some embodiments, a random access channel preamble transmission opportunity associated with the common paging occasion can have a predetermined time interval toward the common paging occasion.

PARTIAL GLOSSARY

DCI Downlink Control Information
PDCCH Physical Downlink Control Channel
RRC Radio Resource Control
SL SideLink
SL-RSRP SideLink Reference Signal Received Power
UE User Equipment

We claim:
1. An apparatus, comprising:
at least one processor; and
at least one memory including computer program instructions, wherein the at least one memory and the computer program instructions are configured to, with the at least one processor, cause the apparatus at least to perform:
receiving, from a network element, a system information block message having an information element to configure monitoring of paging messages at a common paging occasion,
wherein the common paging occasion is configured for user equipment that are in idle state or inactive state with respect to the network element and that are configured to act as a user-equipment-to-network relay user equipment; monitoring a page at the common paging occasion based on the information element;
sending a random access preamble dedicated to the apparatus in response to the page; and
performing a state transition to connected mode only after a response to the random access preamble is received.
2. The apparatus of claim 1, wherein the monitoring the page is conditioned on the apparatus having sent a relay discovery message or a relay discovery response message.
3. The apparatus of claim 2, wherein the monitoring the page is further conditioned on a timer not having elapsed since the relay discovery response was sent or the relay discovery message was sent.
4. The apparatus of claim 1, wherein the monitoring the page is conditioned on a downlink control information in a physical downlink control channel comprising an indicator of a discovery model that the apparatus performs.
5. The apparatus of claim 1, wherein the monitoring the page is conditioned on a downlink control information in a physical downlink control channel comprising an indicator of a user equipment to which the apparatus sent a relay discovery response.
6. The apparatus of claim 1, wherein the sending the random access preamble is conditioned on a downlink reference signal received power exceeding a predetermined threshold.
7. The apparatus of claim 1, wherein the at least one memory and the computer program instructions are further configured to, with the at least one processor, cause the apparatus at least to perform: waiting for a response to the random access preamble; and taking no further action regarding the random access preamble if the response is not received.
8. The apparatus of claim 1, wherein the sending of the random access preamble is performed according to a time slot, occasion, or time interval that is configured by the network element.

9. The apparatus of claim 1, wherein the page comprises an identifier of the apparatus and the random access preamble dedicated to the apparatus, and the sending is performed conditioned on the identifier of the apparatus being present in the page.

10. The apparatus of claim 1, wherein the page comprises a list of identifiers of relay user equipment including an identifier of the apparatus.

11. The apparatus of claim 1, wherein the information element is configured to include a configuration of a random access channel preamble transmission opportunity associated with the common paging occasion.

12. The apparatus of claim 1, wherein a random access channel preamble transmission opportunity associated with the common paging occasion has a predetermined time interval toward the common paging occasion.

13. A method, comprising:
  receiving, at a user equipment from a network element, a system information block message having an information element to configure monitoring of paging messages at a common paging occasion,
  wherein the common paging occasion is configured for user equipment that are in idle state or inactive state with respect to the network element and that are configured to act as a user-equipment-to-network relay user equipment;
  monitoring a page at the common paging occasion based on the information element; sending a random access preamble dedicated to the user equipment in response to the page; and
  performing a state transition to connected mode only after a response to the random access preamble is received.

\* \* \* \* \*